United States Patent [19]

Ingram

[11] Patent Number: 4,817,997
[45] Date of Patent: Apr. 4, 1989

[54] HOSE COUPLING

[76] Inventor: Thomas L. Ingram, 2313 Meadowlark Ln., Bedford, Tex. 76021

[21] Appl. No.: 66,866

[22] Filed: Jun. 25, 1987

[51] Int. Cl.$^4$ ............................................. F16L 33/20
[52] U.S. Cl. ..................................... 285/256; 285/330
[58] Field of Search ........................ 285/256, 259, 330

[56] References Cited

U.S. PATENT DOCUMENTS

| | | | |
|---|---|---|---|
| 2,314,002 | 3/1943 | Lusher et al. | 285/256 X |
| 2,329,281 | 9/1943 | MacWilliams et al. | 285/256 X |
| 2,374,225 | 4/1945 | Melson | 285/259 X |
| 3,345,091 | 10/1967 | Nicol | 285/256 |
| 3,589,752 | 6/1971 | Spencer | 285/259 X |
| 4,603,888 | 8/1986 | Goodall et al. | 285/259 X |

Primary Examiner—Dave W. Arola
Attorney, Agent, or Firm—W. Kirk McCord

[57] ABSTRACT

A coupling for connecting a flexible hose to a fluid source, such as a gasoline fuel pump, comprised of a stem member on one end of the coupling for being inserted into the inlet end of the hose, an annular collar member for limiting the depth of insertion of the stem member into the hose and a male threaded member on the opposite end of the coupling for engaging complementary female threads to attach the hose and coupling to the fluid source. A recessed portion is defined between the collar member and male threaded member. The recessed portion has a plurality of relatively flat outer surfaces around the perimeter thereof, which are interconnected to define a square with rounded corners. A cylindrical sleeve member is concentrically disposed on the hose adjacent to the inlet end thereof so that the sleeve member slightly overlaps the inlet end. When the stem member of the coupling is inserted into the hose, the sleeve member is also concentrically disposed with respect to the collar member and the recessed portion. The sleeve member is preferably comprised of a soft, malleable metal material, which is deformable around the flat surfaces of the recessed portion when the sleeve member is crimped to the hose and coupling. The deformation of the sleeve member around the flat surfaces enhances the gripping action between the sleeve member and the coupling to fix the sleeve member against rotation with respect to the coupling. The hose can then be selectively connected to and disconnected from the fluid source by exerting torque on the sleeve member.

13 Claims, 2 Drawing Sheets

HOSE COUPLING

FIELD OF THE INVENTION

The present invention relates generally to hose couplings and in particular to a coupling for connecting a flexible hose to fluid source.

BACKGROUND OF THE INVENTION

Flexible hoses made of rubber material or the like are frequently used for dispensing fuel, such as gasoline. The hose typically has a manually operable handle at the discharge end thereof and is coupled to a fuel source, such as a gasoline pump, at the inlet end of the hose. Couplings made of metal material such as brass are often used to connect the inlet end of the hose to a fuel source. Such couplings include a stem member on one thereof for being inserted into the inlet end of the hose and a male threaded member on the opposite end thereof for engaging a female threaded orifice, which extends through a bulkhead of a housing in which the fuel source is disposed. An hexagonal nut is disposed between the male threaded member and the stem member of the coupling, for being gripped by a wrench or other suitable tool, whereby the coupling can be selectively connected to and disconnected from the female threaded orifice by means of torque exerted on the hexagonal nut.

DESCRIPTION OF THE PRIOR ART

According to prior practice, a sleeve member is concentrically disposed on the hose adjacent to the inlet end thereof before the stem member is inserted into the hose. An annular collar member having a substantially greater diameter than the diameter of the stem member is proximately disposed relative to the stem member for engaging the inlet end of the hose to limit the depth of insertion of the stem member into the hose. Disposed between the collar member and the hexagonal nut is a recessed portion, around which sleeve member is concentrically disposed.

The sleeve member is preferably comprised of a malleable material so that the sleeve member can be crimped against the hose to compress the hose against the stem member of the coupling member to prevent the hose from being disengaged from the coupling. The sleeve member is also crimped against the surface of the recessed portion to enhance the connection between the hose and the coupling.

One problem associated with such prior art couplings is that the hexagonal nut must be gripped by a wrench or other tool in order to connect and disconnect the hose to and from the fuel source. It is advantageous to connect the male and female threads inside of the housing for safety purposes so that in the event of leakage at the connection, the leakage will be retained within the housing. Because the hexagonal nut is proximately disposed with respect to the male connecting threads of the coupling, the nut may be at least partially disposed within the housing in which the fuel source is located when the male threads are connected to the corresponding female threads within the housing. This configuration makes it difficult to properly engage the nut with a wrench or other tool.

Any attempt to connect or disconnect the coupling to or from fluid source by exerting torque on the sleeve member will not be successful because the sleeve member will tend to rotate relative to the coupling member when torque is exerted thereon. This also results in an unwanted twisting action on the hose, leading to kinks in the hose and other possible damage. The sleeve member is in contact with the coupling only along the respective perimeters of the collar member and the recessed portion. Because these surfaces are substantially cylindrical, the gripping action between the sleeve member and the coupling member is not sufficient to allow the coupling member to be rotated by means of torque exerted on the sleeve member.

Hose couplings of various types are shown and described in U.S. Pat. Nos. 4,606,783; 4,093,280; 2,978,262; 2,698,191; 2,357,69; 2,211,978; 2,158,538; and 1,588,606.

OBJECTS OF THE INVENTION

It is, therefore, the principal object of the present invention, to provide an improved hose coupling.

It is another object of the invention is to provide a hose coupling which is particularly adaptable for fuel-dispensing hoses.

Yet another object of the invention is to provide a hose coupling for connecting the inlet end of a flexible hose to a fluid source.

Still another object of the invention is to provide a hose coupling which can be selectively connected to and disconnected from a fluid source by applying torque to a sleeve member concentrically disposed on the hose.

A further object of the invention is to facilitate the connection and disconnection of the inlet end of a fuel-dispensing hose to and from a fuel source.

SUMMARY OF THE INVENTION

These and other objects are accomplished in accordance with the present invention wherein a device for coupling a fluid delivery hose to a fluid source is provided. The device is comprised of a first coupling member for being inserted into the hose at an inlet end thereof, a second coupling member for being connected to the fluid source and a third coupling member disposed between first and second coupling members. The third coupling member has a plurality of relatively flat surfaces around the perimeter thereof. A sleeve member is provided for being concentrically disposed around a portion of the hose adjacent to the inlet end and around the third coupling member. The inner surface of the sleeve member engages the flat surfaces of the third coupling member to substantially fix the sleeve member against rotation with respect to the first, second and third coupling members when the sleeve member is crimped against the hose and the third coupling member.

In one embodiment the device further includes an annular collar member proximately disposed with respect to the first coupling member for engaging the inlet end of the hose to limit the depth of insertion of the first coupling member therein and an hexagonal member proximately disposed with respect to the second coupling member. The third coupling member is defined by a recessed portion between the collar member and the hexagonal member. The recessed portion has four flat surfaces interconnected to define a substantially square shape in cross-section. Respective intersections between adjacent ones of the surfaces are curved to define a square shape with rounded corners.

In another embodiment the collar member has a plurality of flat surfaces around the circumference thereof which are arranged to define a substantially serrated pattern. The sleeve member is concentrically disposed around the collar member for engaging the flat surfaces thereon when the sleeve member is crimped against the hose and collar member to fix the sleeve member against rotation with respect to the first, second and third coupling members.

In the preferred embodiment the first coupling member is comprised of a plurality of frusto-conical portions arranged in base-to-frustum contact for being inserted into the inlet end of the hose. The collar member has a substantially greater diameter than the respective diameters of the frusto-conical portions to limit the depth of insertion of the first coupling member into the hose. The second coupling member is preferably comprised of a male threaded member for engaging complementary female threads associated with the fluid source. The hose is connected to the fluid source by rotating the device in a first direction by means of torque exerted on the sleeve member and is disconnected from the fluid source by rotating the device in a second direction, opposite from the first direction, by means of torque exerted on the sleeve member. The sleeve member is preferably comprised of a soft, malleable material, which is deformable around the flat surfaces of the third coupling member when a crimping force is exerted on the sleeve member, thereby enhancing the gripping engagement between the sleeve member and the third coupling member.

BRIEF DESCRIPTION OF THE DRAWINGS

Other objects and advantages of the invention will be apparent from the detailed description and claims when read in conjunction with the accompanying drawings wherein:

DETAILED DESCRIPTION OF THE PREFERRED EMBODIMENT

In the description which follows, like parts are marked throughout the specifications and drawings, respectively. The drawings are not necessarily to scale and in some instances proportions have been exaggerated in order to more clearly depict certain features of the invention.

Referring to FIGS. 1-4, a coupling 11 is provided for connecting flexible hose 13, such as that used for dispensing fuel, to a fuel source, such as a gasoline pump (not shown), which is located within a pump housing 14. Flexible hose 13 is of conventional design and is of the type typically used for low pressure (less than 150 pounds per square inch) fuel dispensing operations. Flexible hose 13 is preferably comprised of a relatively thick rubber material with a central bore extending longitudinally therethrough.

Figure 1:
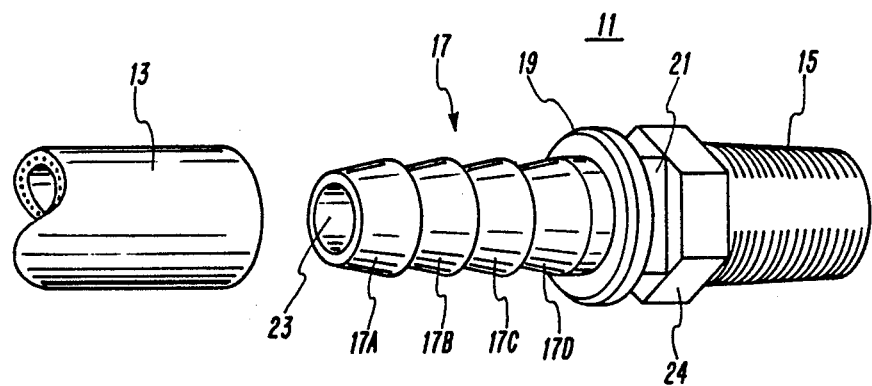
FIG. 1 is a perspective view of the hose coupling according to the present invention.
Figure 2:
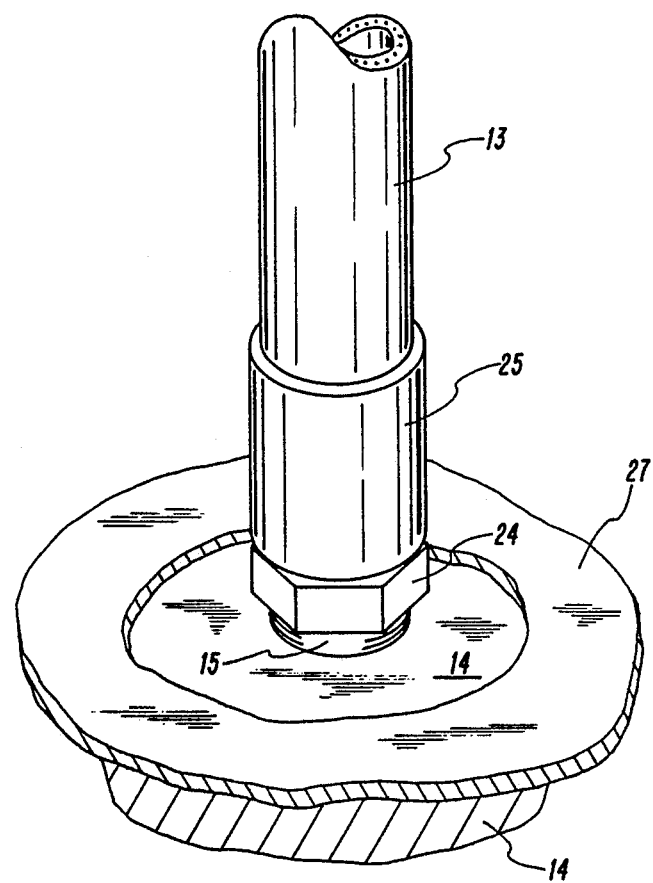
FIG. 2 is a perspective view illustrating the connection of a flexible hose to a fluid source using the hose coupling according to the present invention.

Coupling 11 is preferably comprised of a metal material, such as brass. Coupling 11 includes a plurality of male threads 15 disposed at one end thereof and a stem member 17 disposed at the opposite end of coupling 11. Stem member 17 is comprised of a plurality of frusto-conical members 17A, 17B and 17C and 17D, which are proximately disposed in base-to-frustum contact, as best seen in FIG. 1.

Figure 3:
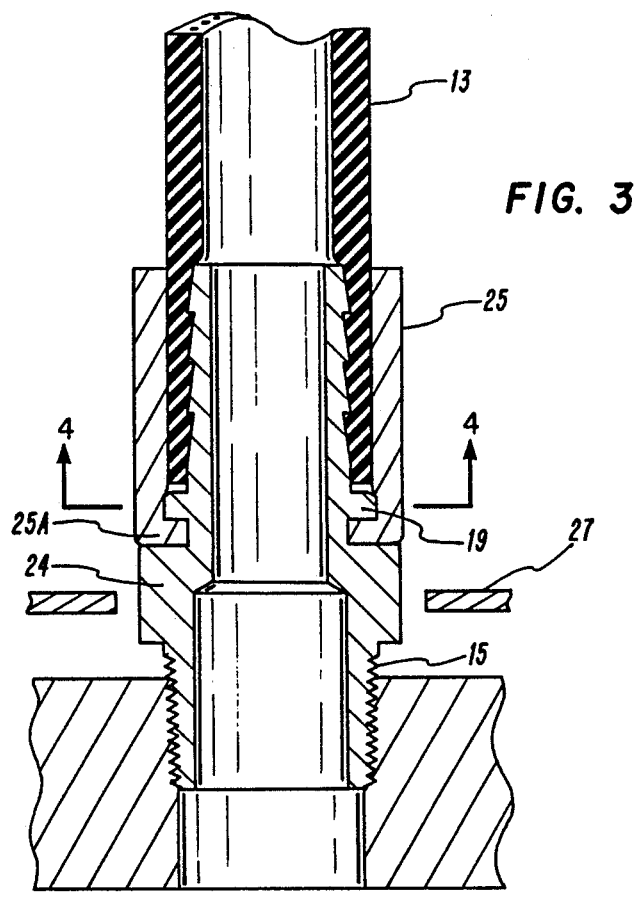
FIG. 3 is a cutaway view in elevation of the connection illustrated in FIG. 2.
Figure 4:
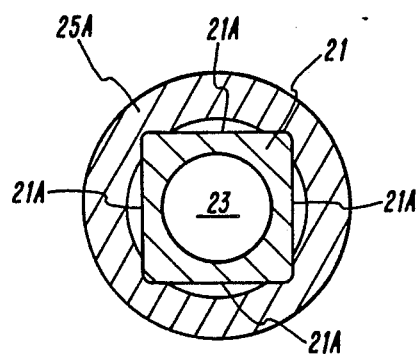
FIG. 4 is a sectional view of the hose coupling according to the present invention, taken along the along the line 4—4 in FIG. 3.

Disposed proximately with respect to frusto-conical member 17D is an annular collar member 19. Collar member 19 has a substantially greater diameter than stem member 17 for engaging the inlet end of hose 13, as best seen in FIG. 3, to limit the depth of insertion of stem member 17 into hose 11. Positioned between collar member 19 and male threads 15 is a recessed portion 21. In accordance with the present invention recessed portion 21 has a plurality of relatively flat surfaces 21A so that in cross-section recessed portion 21 substantially defines a square with rounded corners, as best seen in FIG. 4. Coupling 11 has an elongated passageway 23 extending longitudinally therethrough for allowing fluid to pass from the fuel source to hose 13. An hexagonal nut 24 is disposed between recessed portion 21 and male threads 15. Nut 24 has a substantially greater width than either recessed portion 21 or male threads 15 for being gripped by a wrench or other tool to exert torque on coupling 11 when it is desired to connect or disconnect coupling 11 to or from the fuel source.

In operation coupling 11 is installed so that stem member 17 is substantially received within the inlet end of hose 13, as best seen in FIG. 3. Collar member 19 has a diameter which is greater than the opening in the inlet end of hose 13 to engage the inlet end of hose 13 to limit the insertion of coupling 11 into hose 13 to substantially the length of stem member 17. A cylindrical sleeve member 25 is concentrically disposed around hose 13 adjacent to the inlet end thereof so that a flange portion 25A of sleeve member 25 is slightly overlaps the inlet end of hose 13 to the extent that sleeve member 25 is also concentrically disposed around collar member 19 and recessed portion 21, as best seen in FIG. 3, and also extends radially inward from the remainder of sleeve member 25 around the circumference thereof.

Sleeve member 25 is preferably comprised of a soft, malleable metal material, which can be deformed around hose 13 and coupling 11 to securely crimp hose 13 and coupling 11 together. When sleeve member 25 is crimped against hose 13 and coupling 11, inner surface 13A of flexible hose 13 engages stem member 17 to secure stem member 17 in position within hose 13 as best seen in FIG. 3. Sleeve member 25 also engages flat surfaces 21A of recessed portion 21 to provide a tight fit arrangement, as best seen in FIG. 4, so that sleeve member 25 and coupling 11 are effectively locked against rotation with respect to one another.

This configuration allows hose 13 and coupling 11 to be selectively connected to and disconnected from a fuel source, such as a gasoline pump, by means of torque exerted on sleeve member 25. As best seen in FIG. 3, male threads 15 mate with complementary female threads in an orifice, which extends through a housing 14 in which the fuel pump is located. Housing 14 is disposed behind bulkhead 27. When hose 13 is connected to the fuel pump, hexagonal nut 24 may be at least partially disposed within the pump housing so as not be accessible from outside of bulkhead 27. By locking sleeve member 25 and coupling 11 together, coupling 11, including male threads 15, is rotatable by imparting torque to sleeve member 25, at least a portion of which is outside of bulkhead 17 for being engaged by a pipe wrench or the like to selectively rotate sleeve member 25 and coupling 11.

Another advantage of fixing sleeve member 25 against rotation with respect to coupling 11 is that hose 13, coupling 11 and sleeve member 25 are all rotated together which reduces the twisting action on hose 13. By imparting the torque to sleeve member 25 instead of to hexagonal nut 24, hose kinking is substantially eliminated during the connection/disconnection process. Yet another advantage of imparting torque to sleeve member 25 instead of hexagonal nut 24 is that coupling 11 can be connected to the fuel source inside of bulkhead 27, which makes for a safer connection because any fuel leaks at the connection are retained within the housing.

Figure 5:
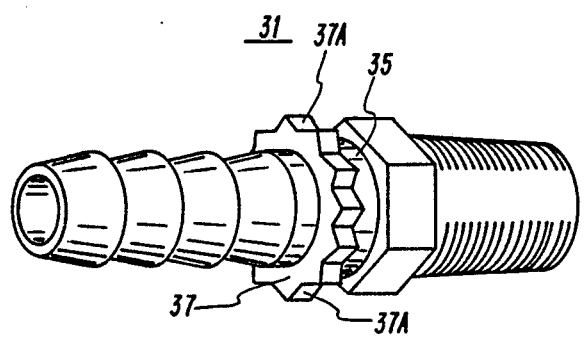
FIG. 5 is a perspective view of an alternate embodiment of the hose coupling according to the present invention.

Referring to FIG. 5, an alternate embodiment of the hose coupling according to the present invention is depicted. Coupling 31 is substantially the same as coupling 11, described above with reference to FIGS. 1-4, except that recessed portion 35 has the conventional cylindrical shape and collar member 37 has a plurality of relatively flat outer surfaces 37A arranged in a serrated pattern around the circumference of collar member 37 for engaging the corresponding sleeve member (not shown) when the sleeve member is crimped to coupling 31. One skilled in the art will recognize that both recessed portion 35 and collar member 37 may have relatively flat outer surfaces to further enhance the gripping action between coupling 31 and the corresponding sleeve member when the sleeve member is crimped to coupling 31.

Various embodiments of the invention have been described in detail. Since it is obvious that many changes in and additions to the above-described preferred embodiment may be made without departing from the nature, spirit and scope of the invention, the invention is not limited to said details, except as set forth in the appended claims.

What is claimed is:

1. A device for coupling a fluid delivery hose to a fluid source, comprising:
   a first coupling member for being inserted into the hose at an inlet end thereof;
   a second coupling member connected to said first coupling member for being connected to the fluid source;
   a collar member disposed between said first and second coupling members, said collar member having a greater diameter than that of the inlet opening of the hose to limit the depth of insertion of the first coupling member into the hose;
   a polygonal member disposed between said second coupling member and said collar member so that a recessed region is defined between said collar member and said polygonal member, said recessed region having a plurality of flat surfaces disposed thereon; and
   a sleeve member for being concentrically disposed around a portion of said hose adjacent to said inlet end so as to overlap said inlet end, said sleeve member for being crimped against said hose and said collar member so that a portion of said sleeve member is received within said recessed region and engages said flat surfaces to substantially fix said sleeve member against rotation with respect to said hose and said first and second coupling members.

2. The device according to claim 1 wherein said second coupling member is comprised of a male threaded member for engaging complementary female threads of said fluid source, said hose being connected to said fluid source by rotating said device in a first direction by means of torque exerted on said sleeve member and being disconnected from said fluid source by rotating said device in a second direction, opposite from said first direction, by means of torque exerted on said sleeve member.

3. The device according to claim 2 wherein said first coupling member is comprised of a plurality of frusto-conical portions, adjacent ones of which are arranged in base-to-frustum contact.

4. The device according to claim 1 wherein said first, second and third coupling members are formed as an integral coupling, said coupling having a central passageway extending longitudinally therethrough for conducting fluid from the fluid source to the hose.

5. The device according to claim 4 wherein said integral coupling is comprised of a metal material.

6. The device according to claim 1 wherein said recessed region has four relatively flat surfaces positioned to define a substantially square-shaped cross-section.

7. The device according to claim 6 wherein the substantially square-shaped cross-section defined by said flat surfaces is that of a square shape with rounded corners, said portion of said sleeve member being deformable around said flat surfaces to enhance the gripping engagement between the sleeve member and the first and second coupling members so that the coupling device is rotatable by means of torque exerted on the sleeve member.

8. The device according to claim 7 wherein said sleeve member is comprised of a soft, malleable metal material.

9. The device according to claim 1 wherein said polygonal member is comprised of a hexagonal nut, said nut being substantially completely exposed after said sleeve member is crimped against said hose, said collar and said flat surfaces.

10. A device for coupling a fluid delivery hose to a fluid source, comprising:
   a first coupling member for being inserted into the hose at an inlet end thereof;
   a second coupling member connected to said first coupling member for being connected to the fluid source;
   a collar member disposed between said first and second coupling members for engaging the inlet end of the hose to limit the depth of insertion of the first coupling member therein, said collar member having a plurality of flat surfaces on the perimeter thereof;
   a polygonal member disposed between said collar member and said second coupling member so that a recessed region is defined between said collar member and said polygonal member; and
   a sleeve member for being concentrically disposed around a portion of said hose adjacent to said inlet end so as to overlap said inlet end, said sleeve member for being crimped against said hose and said collar member so that an inner surface of said sleeve member engages the flat surfaces on the collar member and a portion of said sleeve member is received within said recessed region to substantially fix said sleeve member against rotation with respect to said hose and said first and second coupling members.

11. The device according to claim 10 wherein said second coupling member is comprised of a male threaded member for engaging complementary female threads of said fluid source, said hose being connected to said fluid source by rotating said threaded member in a first direction by means of torque exerted on said sleeve member and being disconnected from said fluid source by rotating said male threaded member in a second direction, opposite from said first direction by means of torque exerted on said sleeve member.

12. The device according to claim 10 wherein said polygonal member is comprised of a hexagonal nut, said nut being substantially completely exposed after said sleeve member is crimped against said hose and said flat surfaces.

13. The device according to claim 10 wherein the relatively flat faces on the perimeter of said collar member are arranged in a substantially serrated pattern.

* * * * *